No. 813,711. PATENTED FEB. 27, 1906.
C. JOHNSON.
FERTILIZER DISTRIBUTER.
APPLICATION FILED MAY 18, 1905.

8 SHEETS—SHEET 1.

WITNESSES:

INVENTOR
Charles Johnson
By E. Laas
ATTORNEY.

No. 813,711. PATENTED FEB. 27, 1906.
C. JOHNSON.
FERTILIZER DISTRIBUTER.
APPLICATION FILED MAY 18, 1905.
8 SHEETS—SHEET 2.
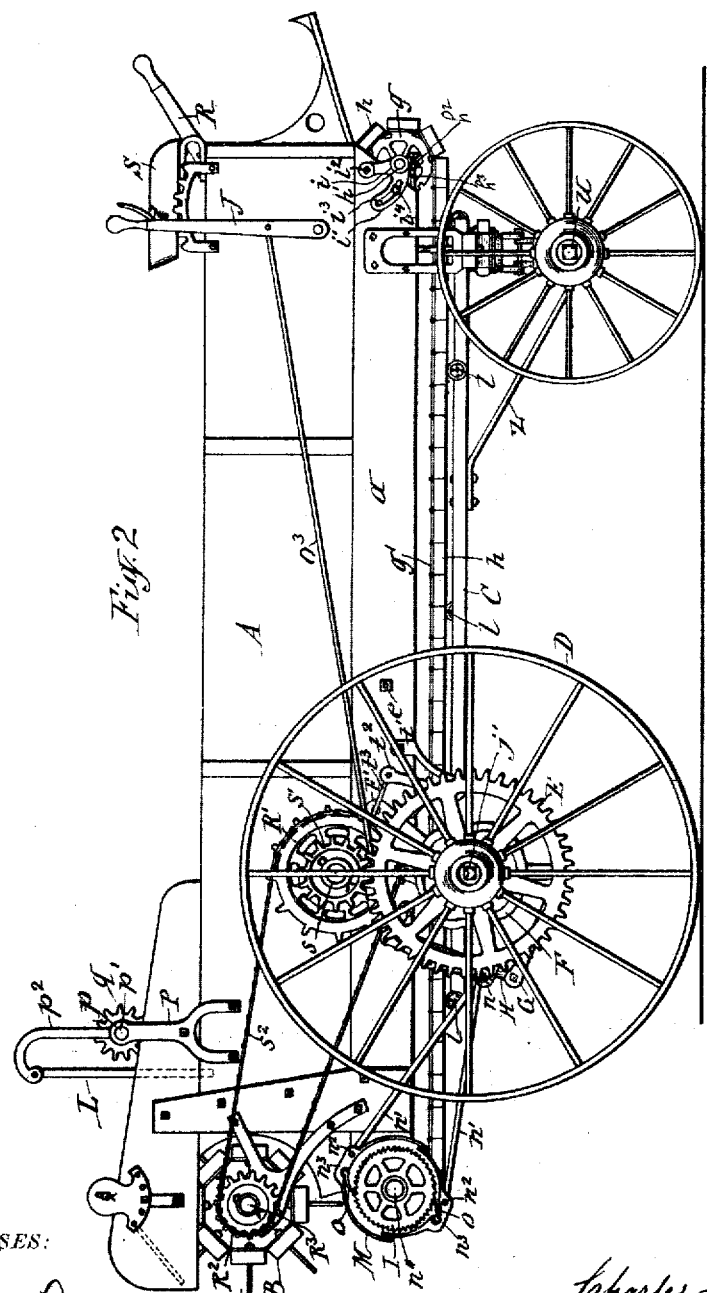

No. 813,711. PATENTED FEB. 27, 1906.
C. JOHNSON.
FERTILIZER DISTRIBUTER.
APPLICATION FILED MAY 18, 1905.
8 SHEETS—SHEET 3.
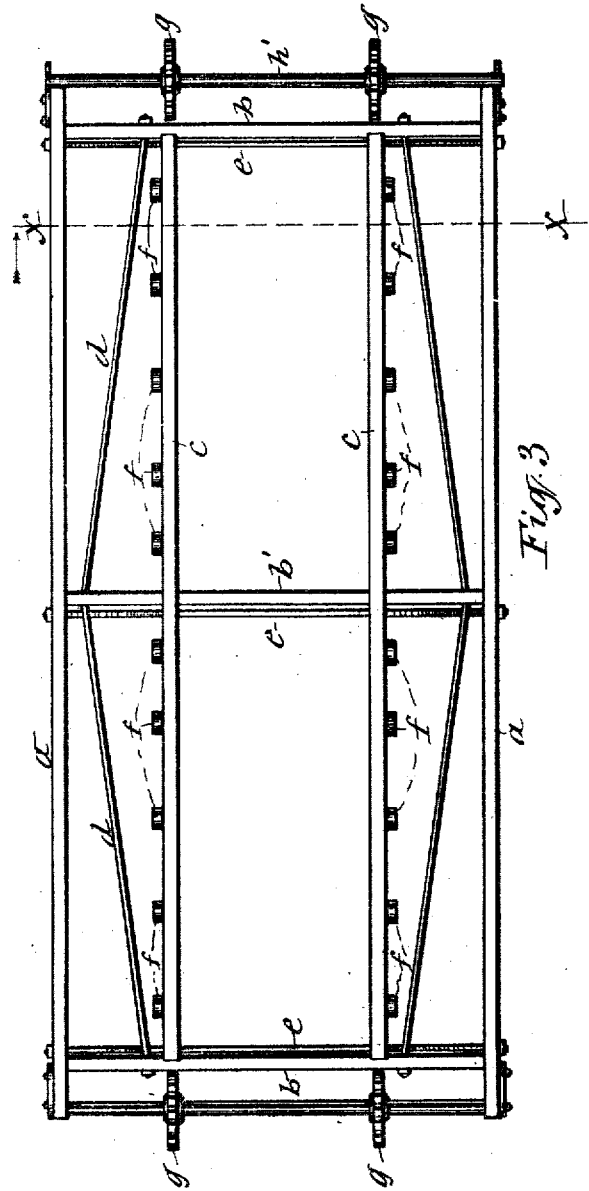
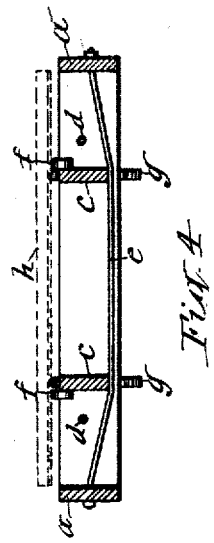
WITNESSES:
INVENTOR
Charles Johnson
By E. Laas
ATTORNEY.

No. 813,711. PATENTED FEB. 27, 1906.
C. JOHNSON.
FERTILIZER DISTRIBUTER.
APPLICATION FILED MAY 18, 1905.

8 SHEETS—SHEET 4.

WITNESSES:

INVENTOR
Charles Johnson
By E. Laass
ATTORNEY.

No. 813,711. PATENTED FEB. 27, 1906.
C. JOHNSON.
FERTILIZER DISTRIBUTER.
APPLICATION FILED MAY 18, 1905.
8 SHEETS—SHEET 6.

WITNESSES:

INVENTOR
Charles Johnson
By E. Laass
ATTORNEY.

No. 813,711. PATENTED FEB. 27, 1906.
C. JOHNSON.
FERTILIZER DISTRIBUTER.
APPLICATION FILED MAY 18, 1905.

8 SHEETS—SHEET 7.

WITNESSES:

INVENTOR
Charles Johnson
By E. Laass
ATTORNEY.

UNITED STATES PATENT OFFICE.

CHARLES JOHNSON, OF CORTLAND, NEW YORK, ASSIGNOR TO CORTLAND IMPLEMENT COMPANY, OF CORTLAND, NEW YORK, A CORPORATION OF NEW YORK.

FERTILIZER-DISTRIBUTER.

No. 813,711.

Specification of Letters Patent.

Patented Feb. 27, 1906.

Application filed May 18, 1905. Serial No. 260,956.

*To all whom it may concern:*

Be it known that I, CHARLES JOHNSON, of Cortland, in the county of Cortland, in the State of New York, have invented new and useful Improvements in Fertilizer-Distributers, of which the following, taken in connection with the accompanying drawings, is a full, clear, and exact description.

This invention relates to the class of fertilizer-distributers which cast the fertilizer from the rear end of an endless apron traveling in the bottom of the vehicle-body carrying the fertilizer.

The object of the invention is to provide efficient and convenient means for regulating the motion of the endless apron according to the character or quality of the fertilizer to be distributed.

The object also is to provide simple and efficient means for moving the tail-board to its required positions.

The object, furthermore, is to throw the tail-board into and out of its operative position simultaneously with the throwing of the beater in and out of gear.

The object also is to thoroughly brace the body of the vehicle, so as to cause it to resist the strain to which it is subjected when the machine is in operation.

Another object is to prevent the slack lower run or returning portion of the apron from sagging and catching on subjacent parts of the machine, all of which objects I attain by the improved construction and combination of parts hereinafter described, and set forth in the annexed claims.

Figure 1:
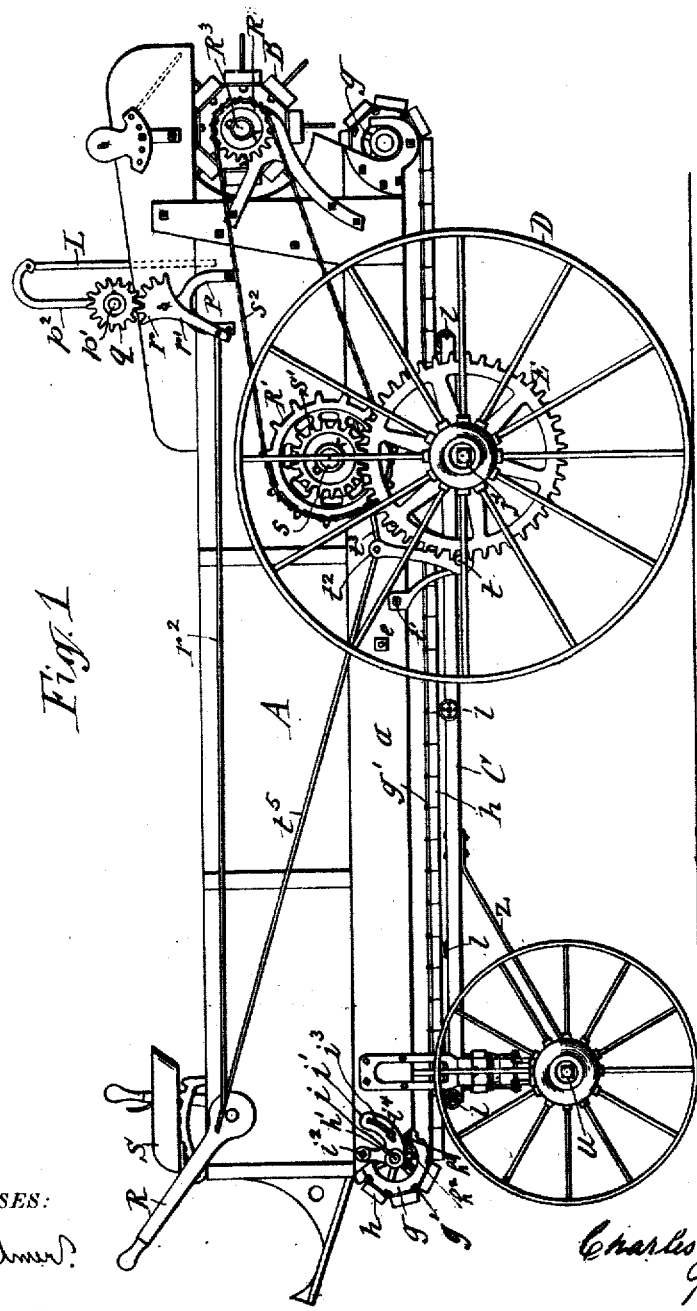
Figure 5:
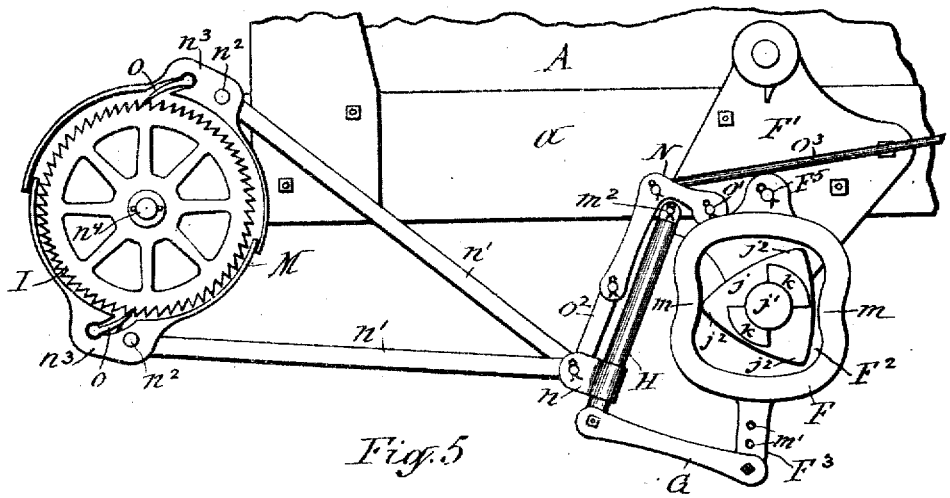
Figure 6:
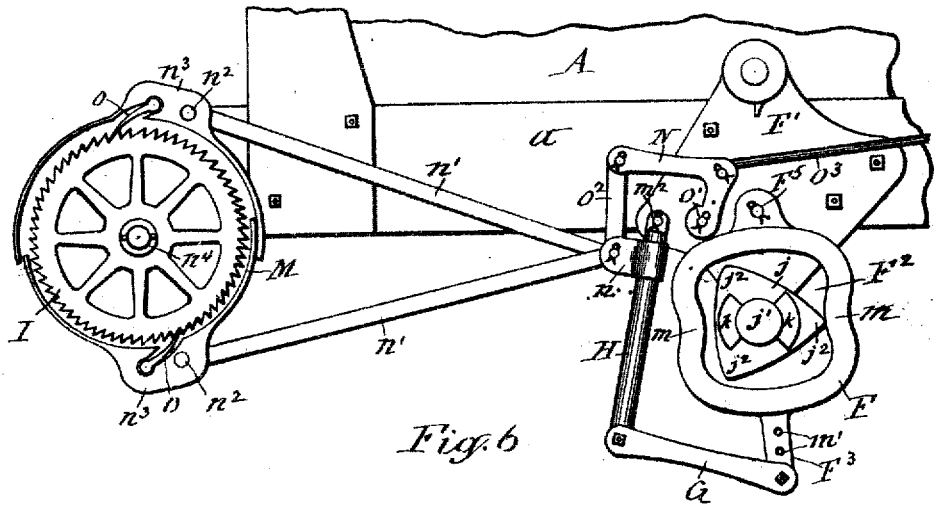
Figure 7:
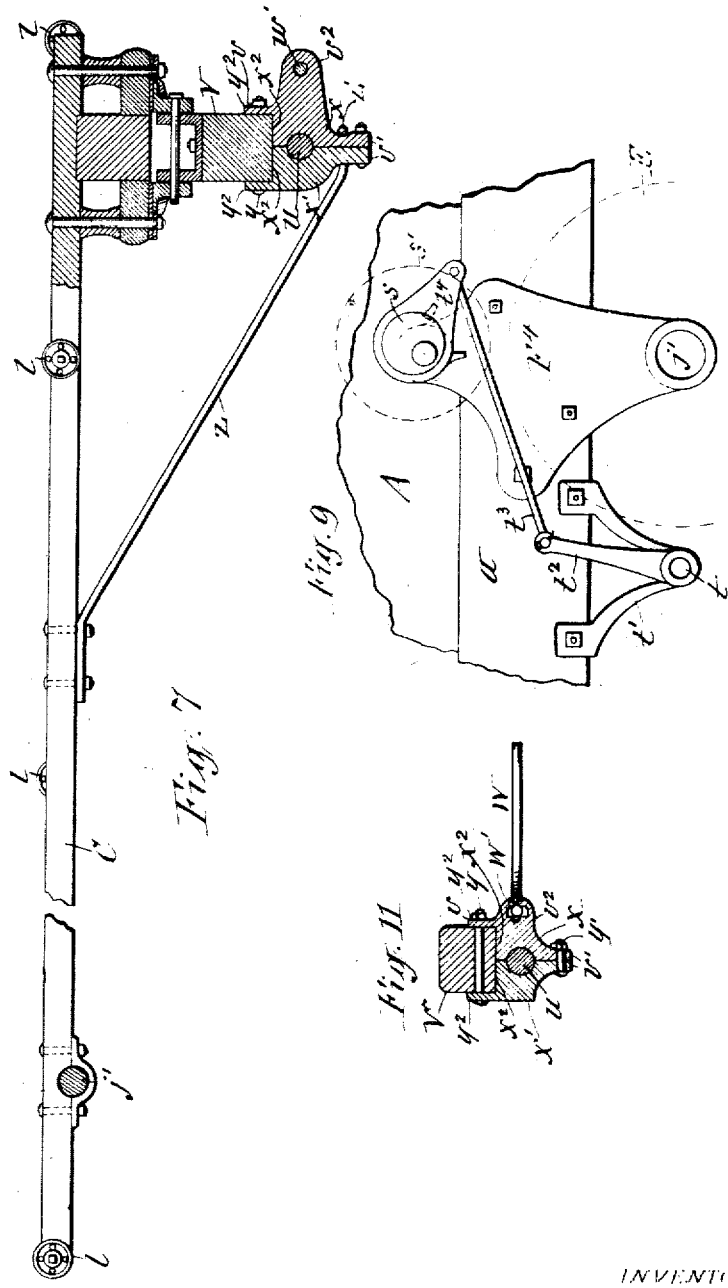
Figure 8:
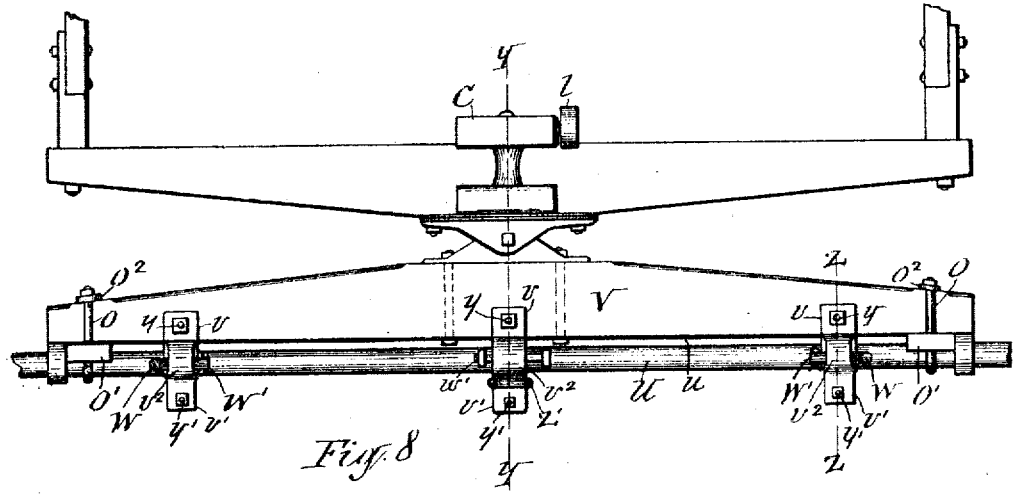
Figure 10:
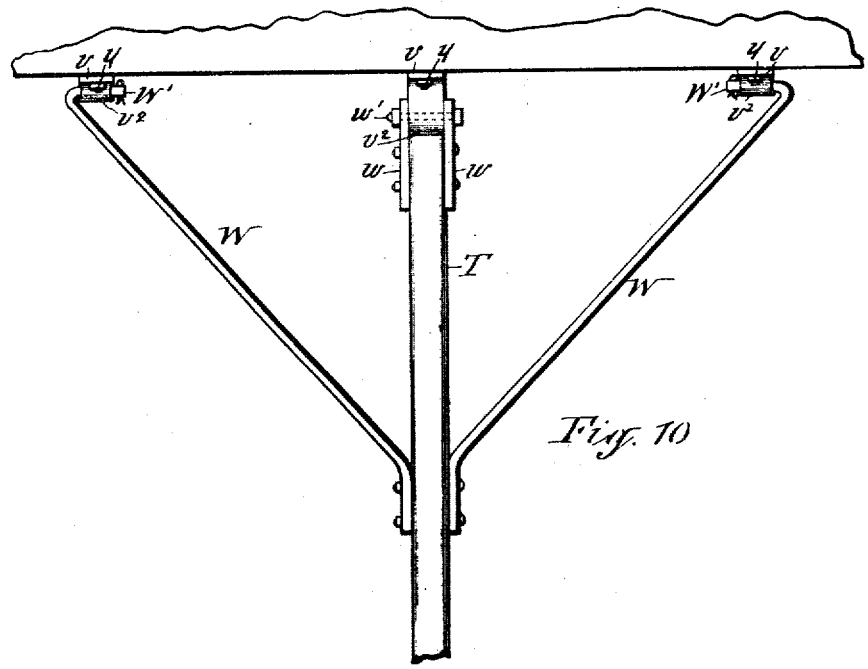
Figure 12:
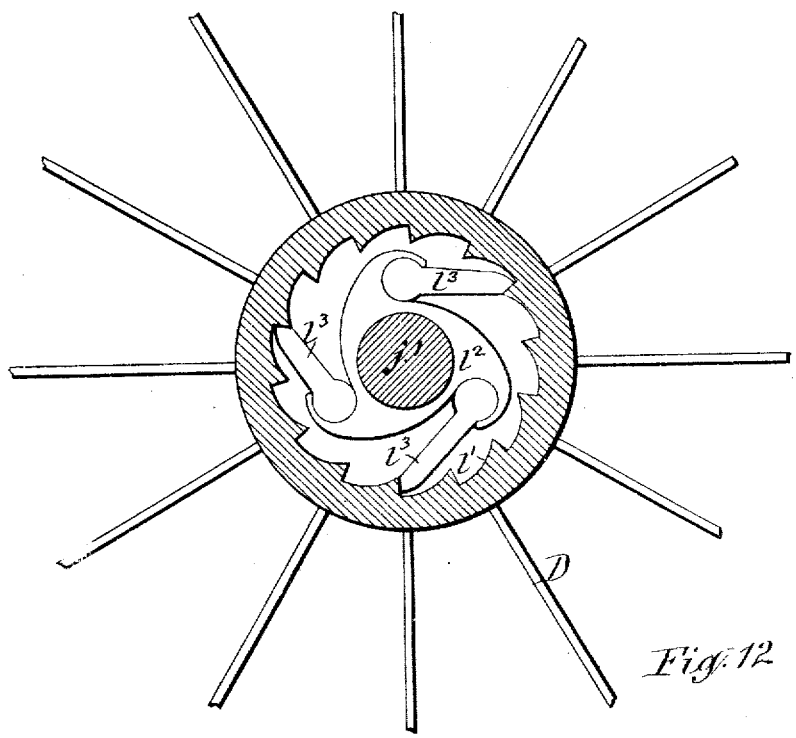
Figure 13:
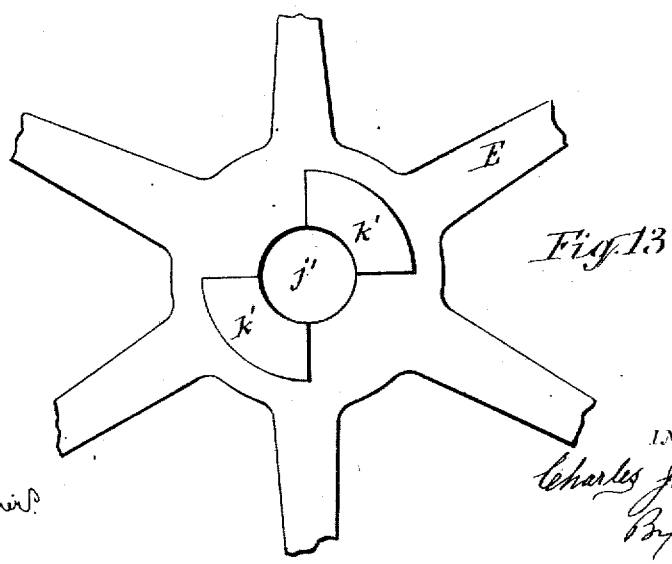
Figure 15:
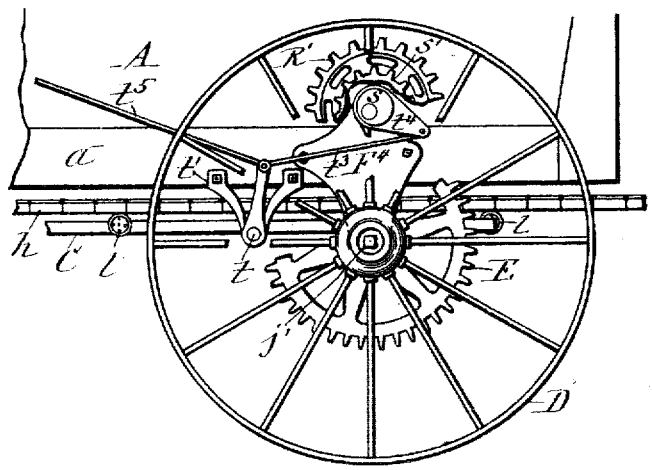
Figure 14:
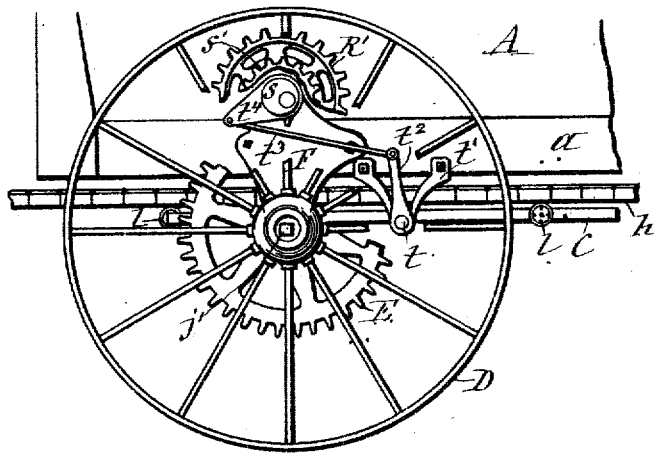

In the accompanying drawings, Figures 1 and 2 are elevations of opposite sides of a fertilizer-distributer embodying my invention. Fig. 3 is a plan view of the bottom frame of the vehicle. Fig. 4 is a transverse section on the line X X in Fig. 3. Figs. 5 and 6 are enlarged side views of the mechanisms for transmitting motion to the endless apron. Fig. 7 is partly a side view of the reach and partly a vertical section on line Y Y in Fig. 8, showing the connection of the front end of the reach. Fig. 8 is a front view of the front axle with parts mounted thereon. Fig. 9 is an enlarged side view of the means for throwing the beater in and out of gear. Fig. 10 is a plan view of the connection of the tongue to the vehicle. Fig. 11 is a transverse section on line Z Z in Fig. 8. Fig. 12 illustrates the clutch which transmits motion to the driving-gears of the machine. Fig. 13 is an enlarged face view of the inner end of the hub of the aforesaid gear; and Figs. 14 and 15 are right and left side views of the rear end portion of the machine with parts of the gears broken away to illustrate the eccentrics, upon which are mounted the pinions and sprocket-wheels which transmit motion to the beater and by means of which eccentrics the said pinions are thrown in and out of engagement with the gear-wheels attached to the rear axle.

Similar letters of reference indicate corresponding parts.

A represents the body of the vehicle, which carries the fertilizer to be distributed. In order to enable the said body to effectually resist the strain it is subjected to when the machine is in operation, I form the said body with a bottom frame which is thoroughly braced, as shown in Figs. 3 and 4 of the drawings, and consists of the side bars $a\ a$, by which the body is mounted on the front and rear running-gears. Said side bars are tied to each other at the center and at their ends by means of cross-bars $b'\ b\ b$. Between the side bars $a\ a$ are longitudinal bars $c\ c$, which are framed in and fastened to the aforesaid cross-bars. $d\ d$ are longitudinal tie-rods, which are fastened at their ends to the end cross-bars $b\ b$ in proximity to the longitudinal bars $c\ c$ and pass through the end portions of the central cross-bar $b'$. $e\ e$ are transverse truss-rod, which are tied at their ends to the side bars $a\ a$ and pass across the bottom of the intermediate longitudinal bars $c\ c$. The frame thus constructed is thoroughly braced to retain its shape and resist the strain exerted by the endless apron carrying the fertilizer and traveling over the said frame.

$f\ f$ designate rollers which are pivoted to the longitudinal bars $c\ c$ and support that portion of the apron upon which the fertilizer is carried.

$g\ g$ denote the sprocket-wheels, which carry the usual chains $g'$ attached to the slats which form the apron, the mechanisms which actuate the apron being omitted in Figs. 3 and 4. In order to allow the chains $g'$ to be adjusted to their requisite tension and to securely retain them in their said adjusted condition, I mount the front shaft $h'$ in bearings $i$, formed in brackets $i'$, which are pivotally attached to the sides of the body, as shown at $i^2$, and are provided with segmental slots $i^3$, which are concentric with the pivots $i^2$ and receive through them the bolts $i^4$, by means of which the brackets are clamped on the body. The brackets are also formed with radially-projecting ears $h^2$, which are provided with threaded eyes receiving through them stay-bolts $h^3$, which bear on the end of the body A, so as to effectually resist the strain exerted on the brackets by the tension of the chains $g'$.

$h$ represents the endless apron, which travels through the body A and carries the fertilizer to the rear end of the body, where it is discharged from the vehicle and scattered upon the ground by means of the usual rotary beater B. To prevent the slack lower or returning portion of the apron $h$ from sagging and catching on subjacent parts of the machine, I support the said portion of the apron upon rollers $l\ l$, pivoted to the reach C of the vehicle, as shown in Figs. 1, 2, 7, and 8 of the drawings.

One of the salient features of my present invention resides in the mechanism for transmitting motion to the apron $h$; and it consists of a cam-plate $j$, mounted on the axle $j'$ of the traction-wheels D and placed at the side of the gear-wheel E, which by means of a suitable clutch receives rotary motion from the traction-wheel D. I preferably employ a clutch similar to that shown in my prior patent, No. 789,498, issued May 9, 1905, and illustrated in Fig. 12 of the accompanying drawings, in which $l'$ represents a ratchet formed in the hub of the traction-wheel D. $l^2$ represents a spider, which is attached to or formed on the hub of the gear-wheel E and has dogs $l^3$ pivoted to it and engaging the ratchet $l'$.

The cam-plate $j$ is formed with a plurality of cams $j^2$, which project equidistant from the axis of the plate and are disposed uniform distances apart. The plate $j$ is also formed with a clutch $k$, which engages a corresponding clutch $k'\ k'$ on the hub of the gear-wheel E. (Shown in Fig. 13 of the drawings.) The engagement of said clutch imparts rotary motion to the cam-plate $j$.

F represents a link which is pivoted at its upper end, as shown at $F^5$, to a plate $F'$, bolted to the side of the body A. The pending portion of the said link is formed with an eye $F^2$, in which the cam-plate $j$ rotates. The side portions of the eye F are formed with inward deflections $m\ m$, which during the rotation of the cam-plate $j$ alternately come in contact with the cams $j^2$ at opposite sides of the axis of the plate, and thus impart oscillatory motion to the link F. The lower end of the link F is formed with a downwardly-extending arm $F^3$, which is provided with a vertical row of perforations $m'\ m'$ and has adjustably connected to it one end of a strap G by means of a bolt passing through one of the aforesaid perforations. The opposite end of the strap G is pivotally connected to the lower end of a rock-arm H, which is pivoted at its upper end to the plate F', as shown at $m^2$ in Figs. 5 and 6 of the drawings. The rock-arm H is embraced by a longitudinally-movable sleeve or collar $n$, which is connected by rods $n'\ n'$ to pins $n^2\ n^2$ on two diametrically opposite ears $n^3\ n^3$, formed on the rims of two annular plates M, mounted revolubly on the shaft $n^4$, to which are fastened the ratchet-wheel I and the sprocket-wheels which propel the apron $h$. On the ears $n^3$ are pivoted pawls $o\ o$, which are caused to alternately engage the ratchet-wheel I by the oscillation transmitted to the plate M from the rock-arm H by the rods $n'\ n'$. This causes the apron $h$ to receive an intermittent movement, which can be varied by shifting the sleeve or collar $n$ up or down on the rock-arm H. To allow the movement of the apron to be regulated by the person occupying the driver's seat S on the front of the machine, I mount on the plate F' a bell-crank or two-armed lever N, which is pivoted at the end of one arm to the plate F', as shown at $o'$, and has the end of the other arm connected to the movable collar $n$ by a strap $o^2$, as clearly shown in Figs. 5 and 6 of the drawings. A rod $o^3$ is connected at its rear end to the lever N at the junction of its two arms. The opposite end of the rod $o^3$ is connected to a hand-lever J, pivoted to the side of the front end of the body A and in position to be easily operated by the person on the seat S. By throwing the lever rearward the collar $n$ is moved toward the lower end of the rock-arm H, as shown in Fig. 5, and thus the thrust of the rods $n'\ n'$ is increased and the ratchet-wheel I is turned a correspondingly-increased distance by the engagement of the pawls $o$. By the operator throwing the lever J forward a sufficient distance to draw the collar $n$ to the upper end of the rock-arm, as shown in Fig. 6, the motion of the rods $n'\ n'$ is arrested or reduced to such a degree that the pawls will be unable to actuate the ratchet-wheel. It will thus be observed that the hand-lever J affords convenient and efficient means for controlling the movement of the apron $h$. Aside from the aforesaid adjustment of the motion of the ratchet-wheel a primary adjustment thereof may be effected by shifting the connection of the strap G from one to another of the perforations $m'$ in the arm F. This primary adjustment is designed to be made before the machine is set in operation.

L denotes the movable rear end board or gate, usually termed "tail-board," the function of which is well understood by persons familiar with this class of machines. For supporting and operating this tail-board I attach to the sides of the body A upwardly-extending brackets P, formed at their upper ends with suitable bearings $p$, in which are mounted the ends of a transverse shaft $p'$. To this shaft are rigidly attached two standards $p^2$. The upper end portions thereof are curved rearward and have suspended from their extremities the tail-board L. A pinion $q$, fastened to the shaft $p'$, meshes with a segmental gear $r$, formed on the upper end of a lever $r'$, which is pivoted to the adjacent bracket P and has its lower end connected to the rear end of a rod $r^2$, the front end of which is connected to a hand-lever R, pivoted to the side of the body A near the driver's seat S, as shown in Fig. 1 of the drawings. By operating this hand-lever the tail-board L is raised or lowered, as may be desired.

To allow the beater B to be thrown in and out of gear simultaneously with the aforesaid adjustment of the tail-board, I pivot eccentrics $s$ $s$ to the plate F' and to a plate F⁴ on the opposite side of the body A (see Fig. 9) and mount on said eccentrics the pinions $s'$ and the sprocket-wheels R', which are attached to or formed on the sides of the said pinions and are connected by sprocket-chains $s^2$ with the sprocket-wheels R² R², attached to opposite ends of the beater-shaft R³, as shown in Figs. 1 and 2 of the drawings.

Across the under side of the machine extends a shaft $t$, which is pivoted at its ends in brackets $t'$, attached to the sides of the body A, at the exterior of which are levers $t^2$, fastened to the shaft $t$. These levers are connected by rods $t^3$ to arms $t^4$, which are formed on the eccentrics, as shown in Figs. 9, 14, and 15. One of the levers $t^2$ is connected by a rod $t^5$ to the hand-lever R, which is connected by the rod $r^2$ to the lever $r'$ of the segmental gear $r$, which operates the tail-board. By operating the hand-lever R the tail-board L is raised and lowered, and at the same time the levers $t^2$ are caused to turn the eccentrics $s$, so as to lower and raise the pinions $s'$ to and from engagement with the gear-wheel E, which receives rotary motion from the traction-wheel D.

Figs. 8 and 10 illustrate my preferred attachment of the front axle U to the wooden bed-piece V and the attachment of the tongue or pole T to said axle and consists in the arrangement of the axle with a space $u$ between it and the said bed-piece and firmly tying said parts together by means of clips O O, which engage the lower half of the axle and pass through blocks O', interposed between the axle and bed-piece. The upper ends of said clips are screw-threaded and pass through plates O², seated upon the top of the bed-piece V. The protruding ends of the clips are provided with nuts by means of which the clips are clamped on the axle and bed-piece. To the center and end portions of the bed-piece are bolted clips $v$ $v$ $v$, formed with downward extensions $v'$, which embrace the axle U. I preferably divide each of the clips $v$ vertically into front and rear plates $x$ $x'$, joined on a line central of the axle, as shown in Figs. 7 and 11 of the drawings. Said clip-plates are formed with seats $x^2$ for the bottom of the bed-piece V and are clamped firmly together by means of bolts $y$ $y'$. The bolts $y$ pass through the side flanges $y^2$ on the plates and through the bed-piece V, and the bolts $y'$ pass through the downward extensions $v'$ of the clip-plates. To connect the tongue T directly to the axle and dispense with the cross-bar, which is usually attached to the rear end of the tongue, I form the clips $v$ $v$ $v$ with coupling-ears $v^2$ and attach directly to the end of the tongue suitable shackle-irons $w$, which extend rearward from the tongue and receive between them the coupling-ear $v^2$ of the central clip $v$, as shown in Fig. 10 of the drawings. A bolt $w'$ passes through the shackle-irons and coupling-ear and is provided with a head and nut to retain said parts coupled together. To the sides of the tongue T at a suitable distance from the rear end thereof are attached brace-rods W W, which extend obliquely therefrom and have their rear ends terminated in coupling-shanks W', which are parallel with the axle and are inserted into the coupling-ears $v^2$ $v^2$ of the clips $v$ $v$, which are attached to the bed-piece V near the ends thereof. To the protruding ends of the shanks W' are attached cotters or other suitable means for retaining said shanks in the coupling-ears.

Z denotes the reach-brace, which is formed with a loop $z'$, embracing the downward extension $v'$ of the central clip $v$.

What I claim as my invention is—

1. The combination with the vehicle-body provided with a longitudinally-movable apron, a ratchet-wheel transmitting motion to said apron, and pawls engaging the ratchet-wheel at diametrically opposite points, of a rotary cam-plate having its cams projecting equidistant from the axis of the plate and disposed uniform distances apart, a link suspended from the body and swung by contact with the cams, a rock-arm pivoted at one end to the body, a bar pivotally connecting the opposite end of the rock-arm to the link, a collar mounted on the rock-arm movably lengthwise thereof, rods connected to said collar and transmitting motion to the pawls, and means for shifting the collar on the rock-arm as set forth.

2. The combination with the vehicle-body provided with a longitudinally-movable apron, a ratchet-wheel transmitting motion, to said apron, and pawls engaging the ratchet-wheel at diametrically opposite points, of a rotary cam-plate having its cams projecting equidistant from the axis of the plate and disposed uniform distances apart, a link suspended from the body and swung by contact with the cams, a rock-arm actuated by said link, a collar mounted on the rock-arm movably lengthwise thereof, rods connected to said collar and transmitting motion to the pawls, a two-armed lever pivoted at one end to the body and at the opposite end to the movable collar, a rod connected to the central portion of the two-armed lever and extended to the front end of the body, and a hand-lever connected to the front end of said rod as set forth.

3. The combination with the vehicle-body provided with a longitudinally-movable apron, a ratchet-wheel transmitting motion to said apron and pawls engaging the ratchet-wheel at diametrically opposite points, of a rotary cam-plate having its cams projecting equidistant from the axis of the plate and disposed uniform distances apart, a link suspended from the vehicle-body and swung by contact with the cams, a rock-arm pivoted at one end to the body, a bar connecting the opposite end of the rock-arm to the link adjustably to different distances from the pivot of the link, a collar mounted on the rock-arm adjustably lengthwise thereof, rods connecting said collar to the aforesaid pawls, and means for shifting the collar on the rock-arm as and for the purpose set forth.

4. The combination with the running-gears, the reach and the traveling apron, of rollers pivoted to the reach and supporting the lower run of the apron as set forth and shown.

5. In a fertilizer-distributing machine, the vehicle formed with a bottom frame consisting of side bars mounted on the front and rear running-gears, cross-bars tying together the said side bars at the ends and center of the frame, intermediate longitudinal bars fastened to the cross-bars, longitudinal tie-rods fastened at their ends to the end cross-bars in proximity to the intermediate longitudinal bars and passing through the end portions of the central cross-bar, and transverse truss-rods tied at their ends to the side bars and passing across the bottoms of the intermediate longitudinal bars, in combination with transverse shafts supported on the ends of the aforesaid side bars and provided with sprocket-wheels engaging chains attached to the endless apron traveling over the said frame and supported thereon as set forth.

6. The combination with the running-gear, the body, and the endless apron traveling through said body, of the reach disposed beneath the lower run of said apron, and rollers pivoted to said reach and supporting said portion of the apron as set forth.

7. The combination with the vehicle-body, the traveling apron and the beater, of a gear-wheel driven by the traction-wheel, a pinion supported movably to and from engagement with the said gear-wheel, means for shifting said pinion, means for transmitting motion from the pinion to the beater, a transverse shaft mounted on the vehicle-body, standards fixed to said shaft and having their upper ends extended rearward, the tail-board suspended from said rearward extension, a pinion fastened to the transverse shaft, a segmental gear engaging the said pinion, a lever affixed to said segmental gear, a hand-lever, and two rods connecting said hand-lever respectively with the aforesaid pinion-shifting means and the lever of the segmental gear as set forth and shown.

CHARLES JOHNSON. [L. S.]

Witnesses:
S. S. HORTON,
C. M. DE VANY.